Feb. 8, 1944.  D. L. HOWARD  2,341,101
METHOD AND APPARATUS FOR DEHYDRATING NATURAL PLANTS AND GRASSES
Filed Jan. 18, 1941   5 Sheets-Sheet 1
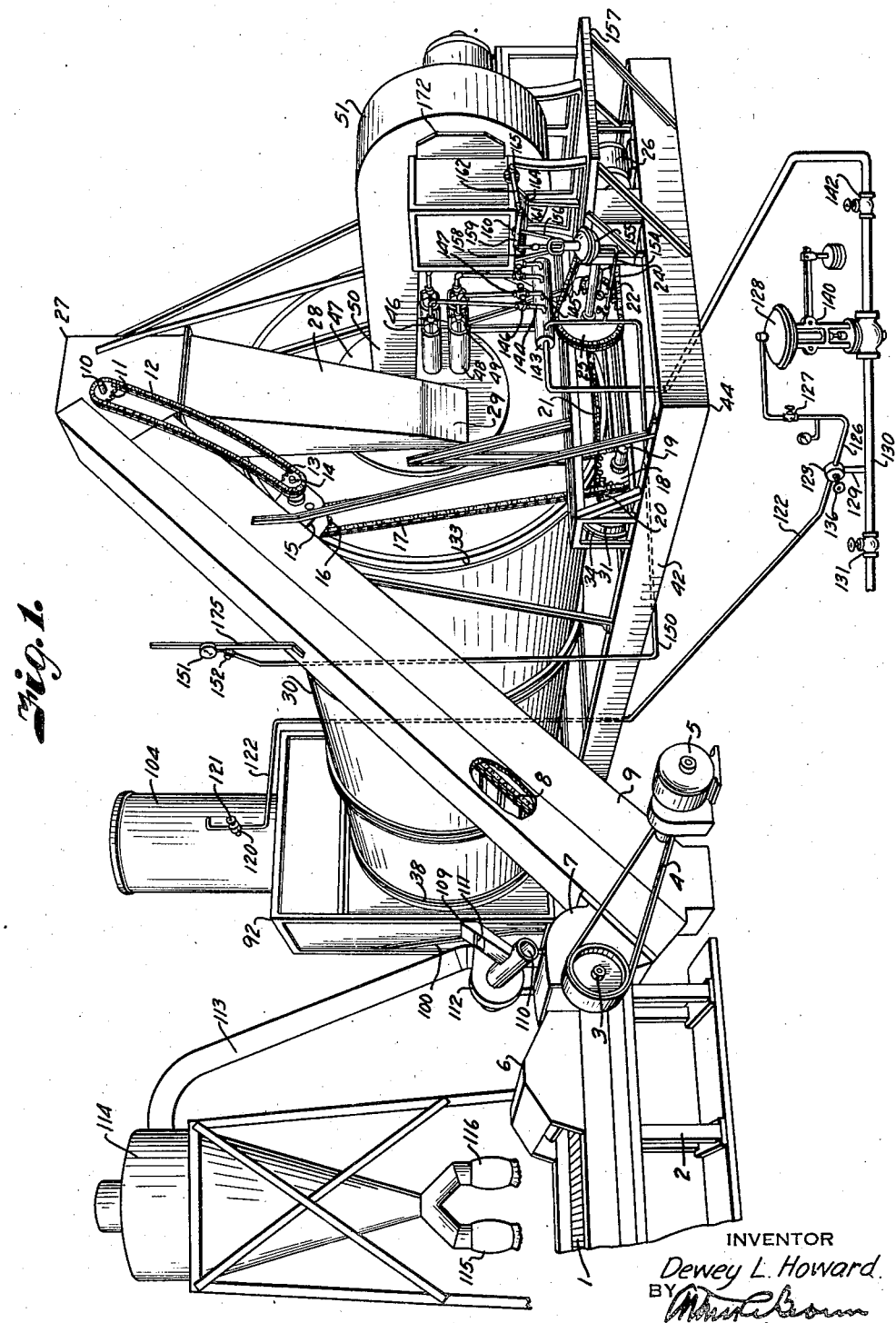
INVENTOR
Dewey L. Howard.
BY
ATTORNEY Feb. 8, 1944.   D. L. HOWARD   2,341,101
METHOD AND APPARATUS FOR DEHYDRATING NATURAL PLANTS AND GRASSES
Filed Jan. 18, 1941   5 Sheets-Sheet 2
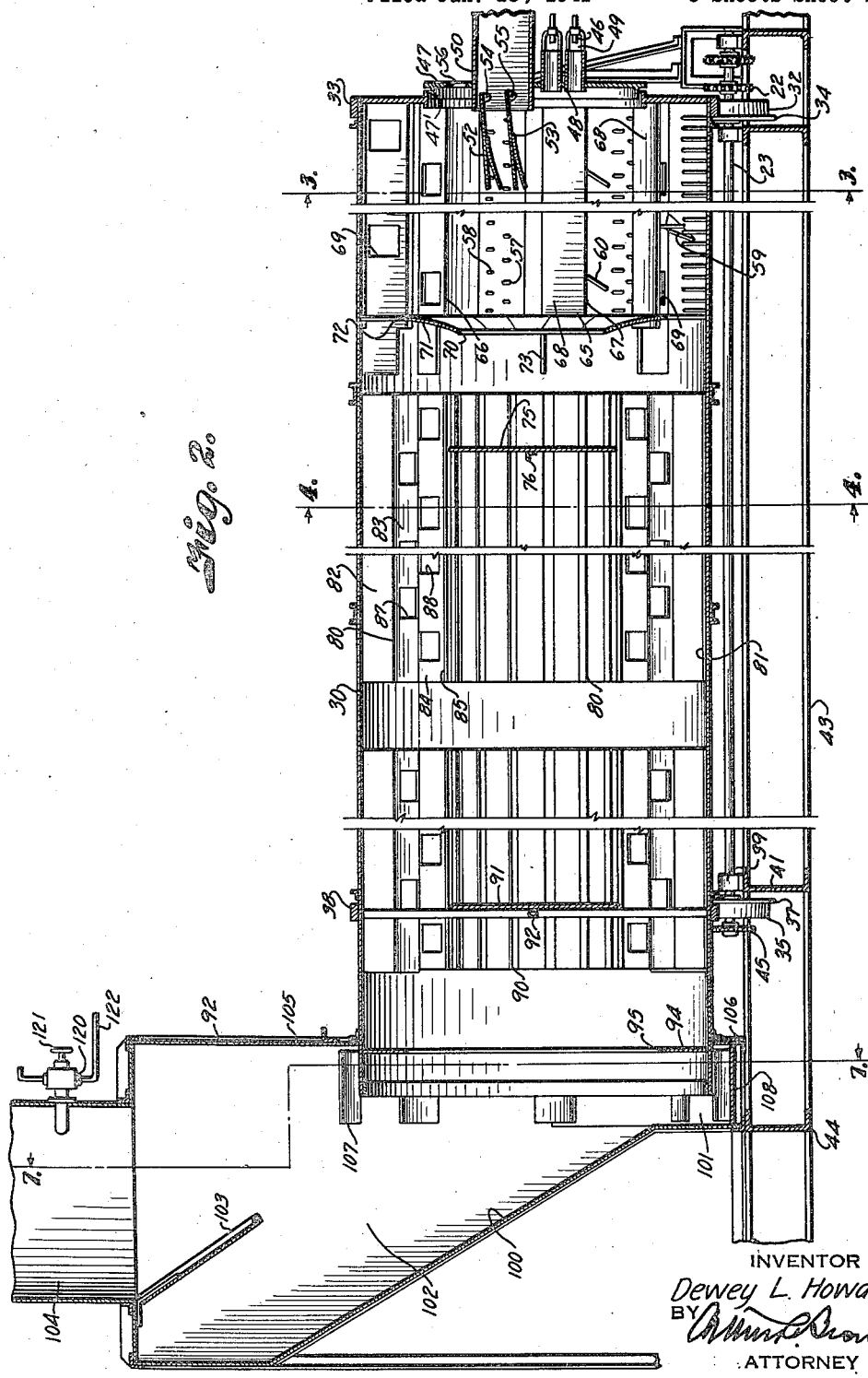
INVENTOR
Dewey L. Howard.
BY
ATTORNEY Feb. 8, 1944.                D. L. HOWARD                2,341,101
     METHOD AND APPARATUS FOR DEHYDRATING NATURAL PLANTS AND GRASSES
                    Filed Jan. 18, 1941        5 Sheets-Sheet 3
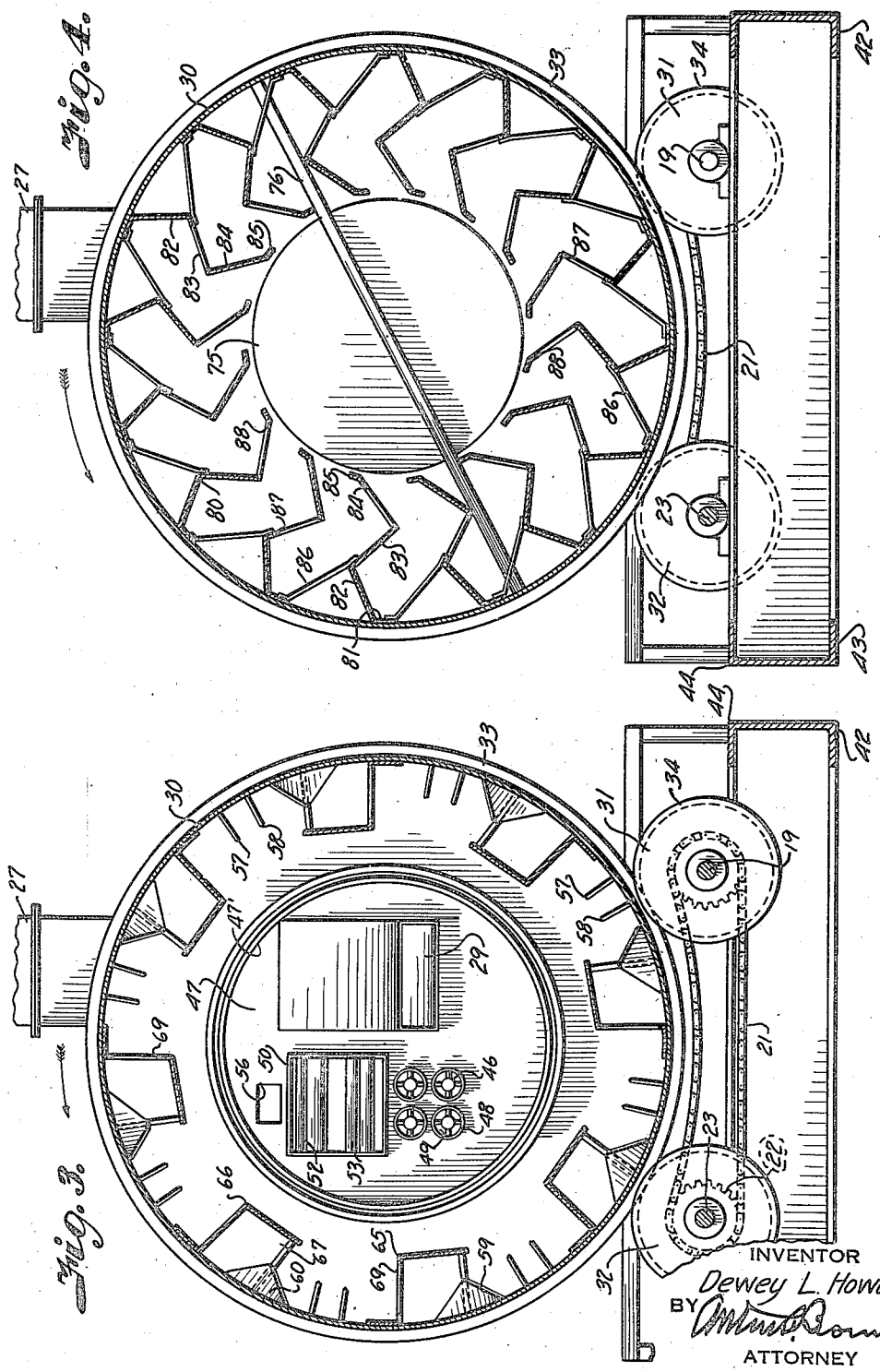
INVENTOR
Dewey L. Howard
BY
ATTORNEY

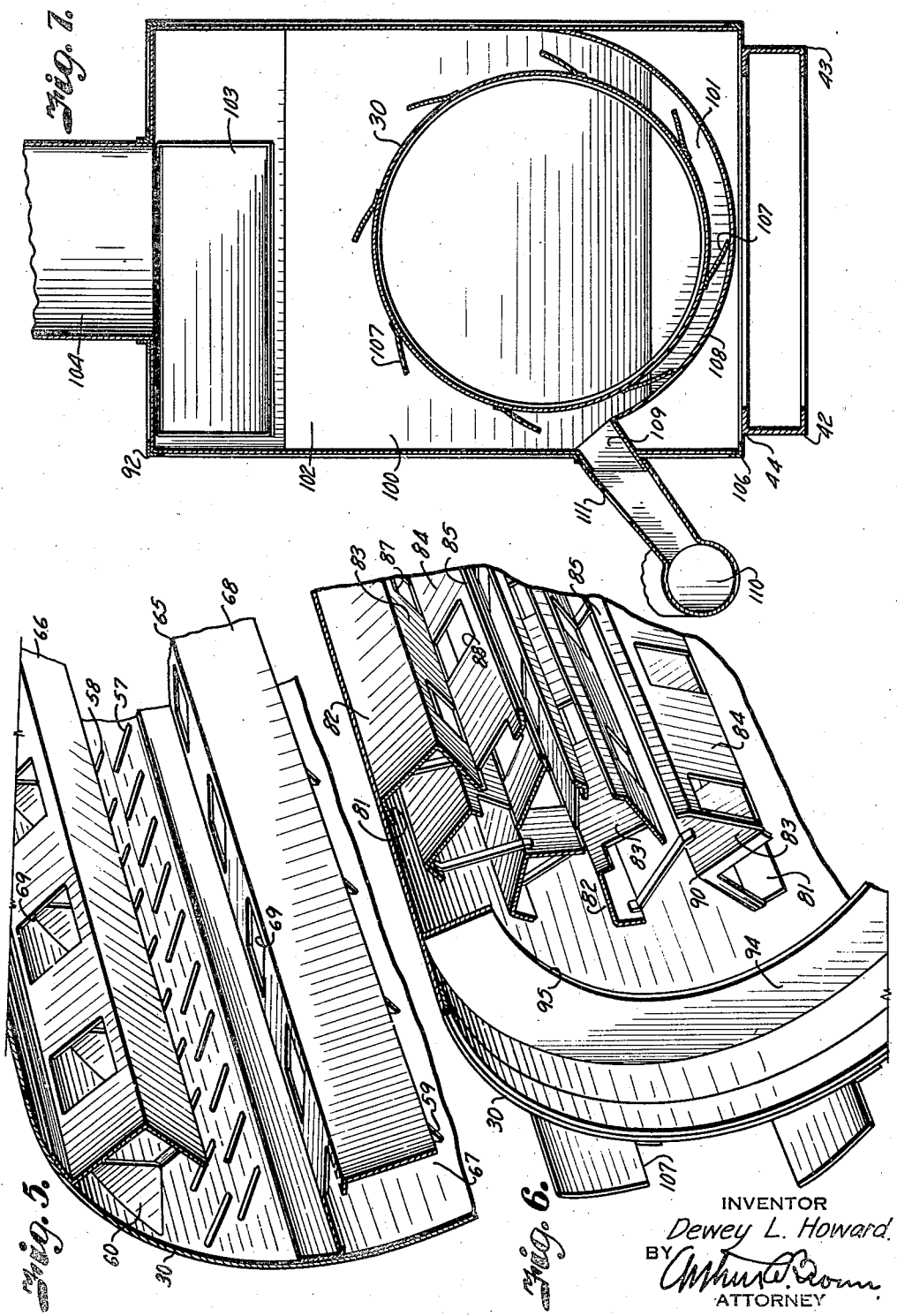

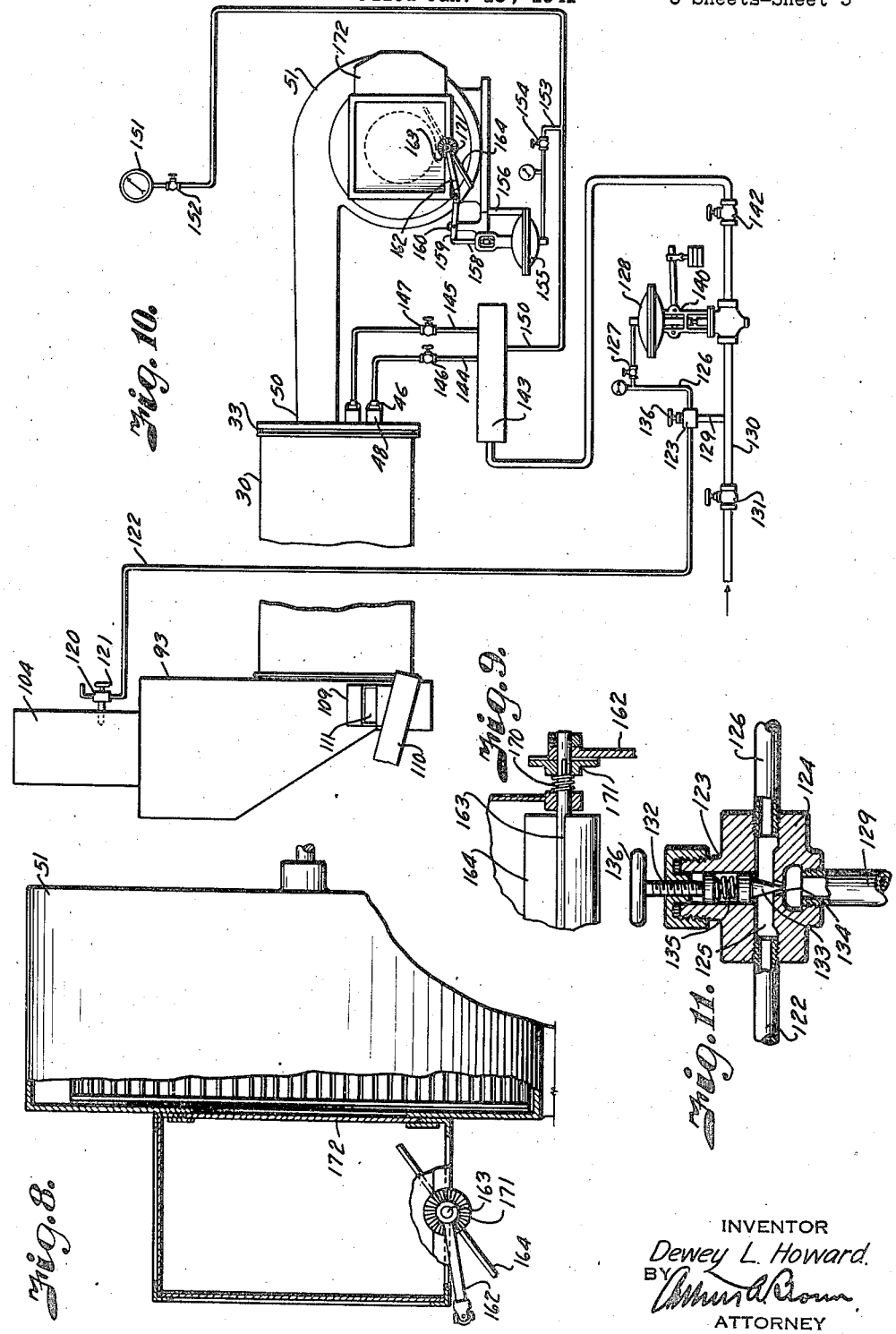

Patented Feb. 8, 1944

2,341,101

UNITED STATES PATENT OFFICE 2,341,101

METHOD AND APPARATUS FOR DEHYDRATING NATURAL PLANTS AND GRASSES

Dewey L. Howard, Neodesha, Kans.

Application January 18, 1941, Serial No. 375,034

11 Claims. (Cl. 34—10)

This invention relates to a method and apparatus for dehydrating crops or the like of natural plants, grasses and similar materials, the principal objects of the invention being to provide a convenient, relatively economical and highly efficient method and apparatus of the character noted.

Other objects of the invention are to dehydrate plants, grasses and the like, in such a manner as to retain, in large measure, the color, taste, nutrition and vitamin content of the natural crop in substantially its uncut condition in the field; to provide for primarily dehydrating a given crop substantially in contact and/or in close proximity to an open flame, yet preventing ignition or over-drying or over-dehydrating of the crop; to control penetration or extension of the flame into and within the dehydrating apparatus; to provide for moving the material being dehydrated through a portion of the dehydrating apparatus in which the contents of the dehydrator are maintained in controlled heat areas; to provide dehydrating equipment in which hermetic sealing is not critical, wherein substantially all of the crop is uniformly exposed to dehydrating media and wherein the dehydrating media are employed for conveying the crop being dehydrated through portions of the dehydrating equipment; to provide for effectively separating the dehydrated crop from dehydrating media inclusive of moisture expelled from the crop; to utilize the moisture expelled from the crop in preventing ignition and/or over-dehydration of the crop; to control dehydration of a crop in relation to quantities of the crop passing through the dehydrating equipment and/or the condition thereof upon dehydration; and to provide improved method steps and sequences thereof, and improved elements and arrangements thereof, in a method and apparatus having the noted characteristics.

In accomplishing these and other objects in the present invention, I have improved details of structure in an apparatus for carrying out the present method, the preferred form of which is illustrated in the accompanying drawings herein.

Fig. 1 is a perspective view of dehydrating equipment embodying the present invention.

Fig. 2 is a longitudinal sectional view of the dehydrating apparatus proper illustrated in Fig. 1.

Fig. 3 is the tranverse cross-section through the dehydrating apparatus substantially on the line 3—3, Fig. 2.

Fig. 4 is a transverse cross-section through the dehydrating apparatus substantially on the line 4—4, Fig. 2.

Fig. 5 is a detail fragmentary perspective view of a portion of the dehydrating drum, particularly illustrating a preferred form of bucket in the first flight of conveyor buckets in the dehydrator drum.

Fig. 6 is a detail fragmentary perspective view of a portion of the dehydrator drum illustrating the preferred form of conveyor bucket, separator ring and paddles employed in the final stage of dehydration in the dehydrator drum.

Fig. 7 is a transverse section through the separator end of the dehydrator drum, on the line 7—7, Fig. 2, particularly illustrating separating elements and outlets for the dehydrated material and dehydrating media respectively.

Fig. 8 is a detail end elevational view through the air supply mechanism for the dehydrating drum, parts thereof being shown in vertical cross-section to more clearly illustrate the relation of the adjustable air inlet valve thereto.

Fig. 9 is a detail vertical cross-sectional view through a portion of the air inlet valve particularly illustrating the manner in which that valve may be initially set.

Fig. 10 is a diagrammatic view showing the relation of the controls for varying supply of heat and air to the dehydrator drum in relation to exhaust temperatures of dehydrating medium.

Fig. 11 is a detail vertical cross-section through a valve for controlling or co-ordinating responses of fuel admitted to the dehydrating drum in relation to exhaust temperatures of the dehydrating drum.

Referring more in detail to the drawings:

1, Fig. 1, designates a conveyor that is supported on suitable standards 2, and is driven by a shaft 3, rotatable in response to movement of a belt 4, that may be suitably actuated by the drive shaft of a motor 5.

A crop of given natural plants, grasses or other similar material, is harvested in a suitable manner and brought to the dehydrating apparatus shown, the crop being deposited on the conveyor, which carries it to a comminuting device 6 and deposits the comminuted crop in a hopper 7.

The hopper 7 delivers the comminuted crop to be dehydrated onto a conveyor 8 that is preferably covered by a shield 9, the conveyor 8 being actuated in response to rotation of the shaft 10 that is driven by a sprocket 11 and chain 12. The chain 12, in turn, is driven by a sprocket 13 mounted on a shaft 14 that is connected with a gear reduction device 15. The gear reduction device is driven by a sprocket 16 connected with a chain 17 which, in turn, runs over a sprocket 18 mounted on a rotatable shaft 19. The rotatable shaft 19 has a sprocket 20 spaced inwardly from the sprocket 18 and provided with a chain drive 21, the opposite end of which is mounted on another sprocket 22, which, in turn, is mounted on a shaft 23. The shaft 23 has a sprocket which is drivingly connected by a chain 24 with a sprocket 25 on the drive shaft of a motor 26.

Conveyance of the comminuted crop to be dehydrated up the conveyor 8 within the shield 9 delivers the crop to a hopper 27, through which the crop falls by gravity for delivery through the lower end 28 of the hopper, Fig. 3, to an outlet 29 from the hopper and into the dehydrating drum 30.

The dehydrating drum 30 is preferably of generally cylindrical shape and horizontally disposed, the front end of the drum resting upon spaced rollers 31 and 32 that are fixed to the shafts 23 and 19, respectively, and driven by the chain 21. The front end of the drum is provided with an annular guide flange 33 engageable with retaining flanges 34 on the rollers 31 and 32 for allowing controlled rotative movement of the drum and for preventing rearward movement of the drum.

The rear end of the dehydrator drum is supported by rollers 35, Fig. 2, which have retaining flanges 37 engageable with an annular guide flange 38 on the drum to allow the said controlled rotative movement of the drum. The rollers 35 are mounted on shafts rotatably supported by bearings 39 that rest upon transverse beams 41 arranged between side sills 42 and 43 of the frame 44 for the dehydrating equipment proper. A chain drive 45 suitably connects the rollers 35 in such a manner that they operate in unison and are responsive to rotation of the drum as actuated by the motor 26 at the forward end of the drum as above described.

As the comminuted crop is progressively delivered to the interior of the dehydrator drum, it is subjected to heat emitted from preferably open fires or flames resulting from ignition of jets of fuel delivered to burners 46 that project inwardly from and are supported by a stationary panel 47 for the dehydrator drum. The panel 47 is supported by suitable brackets mounted on the frame 44, the dehydrator drum being arranged for rotation relative to the panel about the flange 47' of the panel 47. Combustion of the fuels is supported by air induced into tubes 48 surrounding the burners from points exteriorly of the dehydrator drum, as indicated at 49, Fig. 1, and further by air supplied to the discharge end 50, Fig. 3, of the air blower 51, Fig. 1.

Air deflecting spreaders 52 and 53 are pivotally mounted on pins 54 and 55 within the dehydrator drum and adjacent the discharge end 50 of the air blower to adjustably direct the supply of air around the jets of flame issuing from the burner 46 substantially in enveloping relation thereto.

A peep-hole 56 is provided in the end wall of the drum to facilitate observation of the effects of the air and fuel mixture within the dehydrator drum.

As a matter of practice, the jets of fire or ignited fuel preferably project a considerable distance within and longitudinally of the drum and the air supply delivered by the blower 51 is of sufficient volume and velocity to substantially envelope the fire jets to, in effect, prevent actual lodgement of comminuted particles of the crop in the jets of fire.

Ignition of the comminuted particles of the crop is further prevented by steam emitted therefrom as a result of initial dehydration of moisture in the crop. While, therefore, moisture is effectively removed from the crop, burning, charring or other discoloration of the crop is prevented.

It is desirable that all portions or particles of the comminuted crop to be dehydrated be subjected to the action of the heat and air within the dehydrator drum. To this end, tines 57 and 58 arranged in series, as shown in Figs. 2, 3 and 5, are mounted on the inner surface of the dehydrator drum preferably adjacent the crop inlet and extend inwardly toward the center thereof, to engage, mix and prevent balling up of portions of the crop.

Disposed between the series of tines 57 and 58 are series of spaced wing conveyors 59 and 60, which act to mix the comminuted crop and move it forwardly in the direction of movement of air in the drum.

Also arranged between the series of tines and wing conveyors are flights of bucket conveyors 65 and 66. The bucket conveyors 65 and 66 preferably have open forward end 67 and solid walls 68. The rear walls of the bucket conveyors 65 and 66 are preferably apertured as at 69, the apertures in conveyor 65 being offset from the apertures in the conveyor 66, to allow comminuted fodder or the like to drop therethrough onto the solid portion of the next bucket, thus spreading and separating the fodder particles and dropping them through the air surrounding the fire in the dehydrator drum, whereby some moisture is removed from the crop and the steam therefrom aids in protecting the drying particles from ignition.

Particles of the comminuted crop dropping across the central portion of the drum are caught by the current which the air blower and jets of flame create and are moved longitudinally of the dehydrator drum and through a centrally arranged opening 70, Fig. 2, in a ring 71 that is mounted on the inner surface of the drum. The ring 71 also is provided with spaced apertures 72 adjacent its periphery to allow passage of portions of the comminuted crop. Upon passage of the crop past the ring 71, portions of it lodge on the inner surface of the drum, which portions are picked up by the blades 73 in such a manner as to further agitate and thoroughly separate the crop particles and drop them in the path of the air moving through the ring 71.

In order to prevent premature passage of undehydrated crop particles through the dehydrator drum, and to direct the air currents laterally, a baffle 75 is centrally arranged within the drum as by mounting the same on a transverse arm 76, the ends of which are engaged with diametrically opposed portions of the drum. Impingement of the comminuted crop particles against the baffle 75 causes them to spread laterally to the inner surface of the drum and into contact with an intermediate flight of the bucket conveyors 80, as illustrated in Fig. 4.

The bucket conveyors 80 preferably consist of angularly bent plates having base flanges 81 secured in spaced relation to the dehydrator drum from which walls 82 project in angular relation to the bases. Walls 83 project angularly from the walls 82, and walls 84 project angularly from the walls 83. The walls 84 terminate in end flanges 85 arranged angularly relative to the walls 84 and a series of such end flanges 85 substantially define a circle of approximately the diameter of the baffle plate 75. The bucket conveyors 80 are preferably inter-connected by spaced struts 86, and the walls of the bucket conveyors are preferably apertured. For example, the walls 83 of one bucket conveyor 80 are provided with spaced apertures 87, whereas the walls 84 of the bucket conveyors are provided with apertures 88 offset from the apertures 87 whereby the particles of the crop dropping through the apertures in one bucket fall on the wall between the apertures in the wall of the next bucket conveyor which carry the particles to the opposite side of the drum before dropping them into the air current moving through the dehydrator.

From the intermediate flight of bucket conveyors, the comminuted crop is transferred rearwardly relative to the dehydrator drum into the final flight 90, Fig. 2, of bucket conveyors. The arrangement of the bucket conveyors 90 is preferably of a character similar to the intermediate bucket conveyors and the same reference characters apply to the respective parts. Therefore, the detailed description of the intermediate conveyors is believed to suffice for the final flight thereof.

A baffle 91, similar to the baffle 75, and similarly mounted on a cross-arm 92 engaged at its opposite ends with the inner surface of the dehydrator drum, is also provided. The baffle 91 is preferably arranged adjacent to the rear ends of the bucket conveyors 90 and further prevents premature passage of insufficiently dehydrated crop particles into the separator 93.

From the flight of bucket conveyor 90, the substantially dehydrated crop particles are carried to an annular ring 94 having a central aperture 95 through which the crop may pass. There is a tendency for the crop particles to collect in the bottom of the drum on the forward or dehydrator inlet side of the ring 94, but this is an advantage for the reason that heavier, moisture containing particles are thus affected and held back longer than the floating, substantially completely dehydrated particles that pass on through the aperture 95. Rotation of the drum agitates such collecting heavier particles of the crop and carries them upwardly, then dropping them for additional action thereon by hot gases produced by the fire, air and vaporized moisture in the dehydrator drum.

From the aperture 95, the dehydrated crop particles are carried into engagement with the sloping rear wall 100 of the separator 93, where they drop or slide into a recess 101 at the base of the separator and exteriorly of the drum proper. Steam and spent gases of combustion carry on up into the recess 102 of the separator and any comminuted particles of dehydrated crop carried by such steam and spent gases are caught by the baffle 103 and caused to drop back down into the recess 101. The gases and steam pass around the baffle creating a spiral motion which aids in removing any particles before the gases and steam escape to atmosphere through the flue 104.

The drum projects through an opening in the front wall 105 of the separator in such a manner that none of the crop will be lost through the opening. The wall 105 seats on angle arms 106 that are supported by the sill 42 and 43 of the frame 44 of the drum. This arrangement allows for expansion and contraction of the dehydrator drum upon changes in temperature thereof without adversely affecting the connections between the drum and separator.

In order to eject the dehydrated, comminuted crop from the separator 93, and particularly the recess 101 thereof, the rear end of the dehydrator drum is provided with fins 107, Fig. 7, which scrape over an arcuate plate 108 that forms the bottom of the recess 101, and lift the crop therefrom for delivery into an outlet channel 109 from the separator; the crop thus being delivered to a channel 110 exteriorly of the separator.

In order to avoid a suction action in the separator that would normally tend to draw steam into the channel 109, the channel is apertured, as at 111, to allow atmospheric pressure to act in the channel and prevent passage of steam through the channel.

While the dehydrated comminuted crop may be delivered for use through the channel 110, it is sometimes desirable to further process or cool the comminuted crop and to this end a blower 112, Fig. 1, is applied to the channel 110 for drawing the crop and outside air therein to be transferred upwardly through the channel 113 into another separator such as the cyclone separator 114, whence it may be delivered to discharge devices 115 and 116 for sacking or other packaging. The outside air drawn into the channel 110 with the hot crop cools the particles, thereby preparing the crop for immediate sacking or packaging without danger of discoloration or deterioration of the vitamin content in the crop. As a matter of practice, dehydration of material is carried out to an approximately two percent (2%) moisture content which permits the material to be promptly packaged without the customary time loss due to spreading. The reduction of moisture content also prevents heating and rotting and retains the protein value of the natural material.

It is highly important that the amount of fuel and air supplied to the dehydrator drum be sufficient to thoroughly dehydrate the crop. It is just as important that excess supplies be prevented in order that the crop may not be burned or otherwise damaged. I have, therefore, provided a system of controls for supplying fuel and air to the dehydrator drum in relation to the amount of material to be dehydrated.

I have found that the temperature of exhaust steam and spent gases issuing from the flue at the rear end of the dehydrator drum is a reliable indication of conditions within the dehydrator drum and the material dehydrated thereby. I, therefore, mount a thermostatic element 120 in the flue of the separator as shown in Figs. 1 and 10, in such a manner as to actuate the thermostatic element in response to variations in temperature in the stack. Actuation of the thermostatic element is controlled by the adjusting device 121 and the effect of such actuation is transferred by the line 122 to the valve 123, the details of which are illustrated in Fig. 11.

The valve 123 preferably consists of a body 124 having a longitudinal passage 125 connected at one end with the line 122 and at its other end with a line 126 that leads to a valve 127, and subsequently a diaphragm housing 128. A suitable pressure gauge preferably is mounted on the line 126. The valve 123 is also provided with a connection to a line 129 leading to the fuel supply line 130 that is provided with a valve 131. The valve 123 is also provided with a setting device 132 consisting of a tapered plug 133 that seats in a tapered orifice 134 and normally tends to close the connection of the lines 122 and 126 with the line 129. The tapered plug is spring-pressed, as by the coil spring 135, adjustment of tension of which is controlled by the screw and handle 136 for adjusting the pressure differential acting on the valve required to open said valve and supply gas pressure to the diaphragm housing 128. However, the gas normally passes to the thermostat and escapes to atmosphere when the flue gases are cool and said thermostat is open.

The diaphragm in the housing 128 is responsive to actuation of the thermostatic element 120 to, in turn, actuate a balanced regulator 140 to control a pressure in the line 130. The line 130 is also provided with a valve 142, from which the line 130 extends to a manifold 143. Lines 144 and 145, provided with valves 146 and 147, lead from the manifold to the burners 46 for supplying the burners with fuel passing through the line 130.

It is also desirable to supply air in direct relation to the supply of fuel to the burners and to this end a line 150 leads from the fuel manifold 143 to a pressure gauge 151, that may be controlled by a valve 152. A by-pass 153, having a valve 154, leads from the line 150 to one side of the diaphragm housing 155. The diaphragm housing is suitably supported by braces 156 and a suitable standard 157, which, in turn, supports the air blower 51. Movement of the diaphragm in the housing 155, responsive to pressures in line 150 moves a rod 158 that connects with a lever 159 that is fulcrumed, as at 160.

The end of the lever 159, opposite the rod 158, is connected, at 161, with an arm 162, which as shown in Fig. 9, is engaged with a shaft 163 that supports a butterfly valve 164 in the inlet end of the air blower. The shaft 163 is provided with a coil spring 170 that is compressible to allow a setting device 171 to be moved inwardly out of keyed engagement with the arm 162, whereby the butterfly valve may be initially set and then made subject to variations in flue temperatures upon actuation of the lever 159, when the setting device 171 is forced back into engagement with the arm 162 upon relief of pressure on the spring 170.

It is also preferable to indicate to the operator supplying the crop to the dehydrator the condition of the crop. This is preferably accomplished by mounting the gauge 151 in a readily observable location adjacent the conveyor 1 supported by a bracket 175, whereby the operator may be advised of variations in conditions in the dehydrator, and vary his supply of material to be dehydrated accordingly.

The operation of apparatus and the steps of the method arranged as described are as follows:

A crop of a given natural plant, a suitable grass or other material to be dehydrated is applied to the conveyor 1 and transferred by the conveyor 8 to the hopper 27 and into the dehydrator drum 30. Fuel is supplied the burners 46 through the line 130, and air is supplied in suitable quantities by the blower 51. Ignition of the fuel causes dehydrating heat within the dehydrator and the deflectors 52 and 53 cause air from the blower to envelop the flames from the fuel and prevent charring of material to be dehydrated.

The tines, spreaders, wings and bucket conveyors agitate and mix comminuted material within the dehydrator and subject each particle thereof to the action of heat and air in the dehydrator. Evaporation of moisture in the material under heat produces steam which tends to cool the material below burning temperatures.

The blast of air from the blower 51 and the force of the jets of fire issuing from the burners conveys the comminuted, partially dehydrated material past the ring 71 in the dehydrator and effects impingement thereof against the baffle 75 and subsequent lateral distribution of the material substantially throughout the cross-section of the dehydrator. This force of products of combustion, air and steam carries the comminuted material around the baffle and subjects it to further agitation by the intermediate flights of conveyors, the material subsequently passing longitudinally of the dehydrator into engagement with the baffle 91. Further distribution, laterally of the baffle 91, is aided by the buckets in the flight 90 of the conveyors and the dehydrated material passes beyond the flight 90 of conveyors through the aperture 95 of the baffle ring 94 into the separator 93.

The dehydrated material collects in the recess 101 of the separator, or is carried upwardly into engagement with the baffle 103 in the separator, by the motion of spent gases of combustion and steam passing through the dehydrator. The gases and steam pass around the baffle 103 and subsequently are discharged from the separator through the flue 104.

One of the material advantages of this apparatus is that the steam produced by dehydration of the material adds substantially to the volume of vapors in the dehydrator drum acting on the material and thus reduces the amount of work required by the air blower drive.

As the hot gases and steam pass through the flue they contact the thermostatic element 120, the effect of which is transferred through the line 122 to the valve 123. If the gases in the flue are too hot, the action of the thermostatic element closes the end of the line 122 and increases the pressure therein. The effect of the pressure in the line 122 passes through the line 126 to the diaphragm housing 128 to cut off part of the supply of fuel passing through the line 130 by actuating the pressure regulator 140. The manifold 143 is thus provided with less fuel pressure and the flame and the penetration thereof is substantially immediately reduced.

Upon reduction of the fuel pressure to the manifold 143, the effect of that reduction is immediately transferred through the line 150 to the diaphragm housing 155, which allows the rod 158 to settle and the lever 159 to move the arm 162 upwardly for partially closing the butterfly valve relative to the air inlet opening to the blower and thus cut down the supply of air the blower supplies to the interior of the dehydrator drum.

A reversal in conditions, that is, a condition of abnormally cool gas and steam in the flue acts to reverse the control of the valves, diaphragms, manifold and butterfly valve to increase the supply of fuel and air to the dehydrator drum.

The operator, meanwhile is advised of conditions of the dehydrated material by fluctuations in the gauge 151 and can thus vary the supply of material to be dehydrated accordingly.

From the separator 100, the fins 107 scrape the dehydrated material from the separator and transfer it to the channel 109, and subsequently to the channel 110, where it is acted upon by the blower 112, and transferred to the cyclone separator 114. From the cyclone separator, the dehydrated material gravitates to the sacking or other packaging devices of the cyclone separator.

It is apparent, therefore, that the present invention provides a method and apparatus for dehydrating natural plants and grasses and other materials to be dehydrated in a thorough and expeditious manner without burning or charring the material acted upon and yet efficiently enough to thoroughly dehydrate the material. It is further apparent that substantially hermetic sealing of the dehydrator is not critical and operation and maintenance of the present dehydrating equipment is thus facilitated. It is also apparent that the present method and apparatus accomplishes the results desired of them in a facile, economical and efficient manner.

What I claim and desire to secure by Letters Patent is:

1. In an apparatus for dehydrating crops of natural plants, a horizontal dehydrating receptacle, means for supplying a crop to be dehydrated to one end of said receptable, burners at the same end of the receptacle to emit flames within and spaced from the sides of the receptacle, means mounted above the burners for supplying an air blast under pressure to said receptacle above and spaced from said flames, said air blast being wider than the flames whereby the difference in temperature of the air and flames and the rising tendency of the heat effect downward movement of the air at the sides of the flames in substantial envelopment of said flames, means for exposing substantially all of the crop in the receptacle to the action of the flames and air, and means for separating the dehydrated crop from moisture and products of combustion.

2. In an apparatus for dehydrating crops of natural plants, a horizontal dehydrating drum, means for supplying a crop to be dehydrated to one end of said drum, burners at the same end of said drum to emit flames within and spaced from the sides of the dehydrator drum, an air duct having an elongated discharge opening above the burners, said opening being wider than the flames from the burners, means for supplying an air blast to said duct for discharge under pressure above and spaced from said flames whereby the difference in temperature of the air and flames and the rising tendency of heat effect downward movement of the air at the sides of the flames in substantial envelopment of said flames, means for rotating said drum, means in said drum for exposing substantially all of the crop therein to the action of said flames and air, and means for separating the dehydrated crop from moisture and products of combustion in said dehydrating drum.

3. In an apparatus for dehydrating crops of natural plants, a horizontal dehydrating receptacle having a crop inlet and outlet adjacent the respective ends thereof, means for supplying a crop to be dehydrated to said receptacle inlet, burners mounted adjacent the crop inlet and spaced laterally thereof to emit flames within and spaced from the sides of the receptacle, means for supplying fuel to said burners under pressure, means for supplying an air blast under pressure to said receptacle above spaced from and in the same direction as said flames, said air blast being wider than the flames whereby the difference in temperature of the air and flames effect downward movement of the air at the sides of the flames in substantial envelopment of said flames to protect the crop to be dehydrated from excessive heat, means for exposing substantially all of the crop in said receptacle to the action of said flames and air, means for separating the dehydrated crop from moisture and products of combustion.

4. In an apparatus for dehydrating crops of natural plants, a horizontal dehydrator drum, means for applying a crop to be dehydrated to said drum at one end thereof, means for dehydrating said crop including burners to emit flames into and spaced from the sides of said drum at the same end to which the crop is applied, means for agitating said crop in said dehydrator drum to expose said crop to the action of said dehydrating means, said exposing means comprising a flight of bucket conveyors adapted to discharge a portion of said crop to one side of said flames, certain of said conveyors having apertures in the walls thereof to allow passage of the remainder of said crops therethrough for discharge on the other side of said flames, and means for discharging an air blast into said dehydrator drum above and spaced from the flames to protect the crop during passage from one side of the drum to the other from the heat rising from the flames.

5. In an apparatus for dehydrating crops of natural plants, a horizontal dehydrating drum having an inlet and an outlet at the respective ends thereof, means for rotating said drum on a substantially horizontal axis, a transversely arranged baffle in the drum of less width than the inner diameter of the drum for separating said drum into primary and secondary dehydrating chambers, a stationary member substantially closing the inlet end of said drum, means extending through the stationary member at one side of the drum axis for supplying a crop to be dehydrated to the primary chamber, a burner extending through the stationary member on the opposite side of the drum axis to the crop supplying means and adapted to emit flames into the primary chamber, means for discharging an air blast under pressure into the primary chamber above and spaced from the flames from the burner, said air blast being wider than the flames whereby the difference in temperature of the air and flames and the rising tendency of heat effect downward movement of air at the sides of the flames in substantial envelopment thereof by the air to prevent the crop from being burnt by the flames, means in the primary chamber for agitating and dropping said crop through the air current and at the sides of the flames, means in the secondary chamber for agitating and dropping the crop across the entire area of the drum, a separator for separating the dehydrated crop, products of combustion, and vaporized moisture received from the drum, a stack on the separator for release of the products of combustion and vaporized moisture from the separator, a fuel supply for said burner, means including a thermostat on the stack and responsive to the temperature of the products of combustion and vaporized moisture passing therethrough after they have been separated from the crops for acting upon the fuel supply for said burner to limit supply thereto in relation to temperatures in said stack for controlling projection of the flames into the primary chamber, and means for discharging the dehydrated crop from the separator.

6. The method of dehydrating crops of natural plants consisting of moving said crops horizontally through a confined space, subjecting said crops to the action of heat produced by a flame projected horizontally into said space, directing a blast of air under pressure into said space prior to mixing with the products of combustion, said air blast being spaced above and of greater width than the flame whereby difference in temperature of the air and flame and rising tendency of the heat of the flame effect downward movement of the air at the sides of said flame for protecting said crops from said flame by substantial envelopment of the flame by the air, and separating moisture resulting from action of said flame and air on said crops from said crops.

7. The method of dehydrating crops of natural plants consisting of moving said crops horizontally through a confined space, subjecting said crops to the action of heat produced by a flame projected horizontally into said space, directing a blast of air under pressure into said space prior to mixing with the products of combustion, said air blast being spaced above and of greater width than the flame whereby difference in temperature of the air and flame and rising tendency of the heat of the flame effect downward movement of the air at the sides of said flame for protecting said crops from said flame by substantial envelopment of the flame by the air, separating moisture resulting from action of said flame and air on said crops from said crops, and controlling the amount of heat applied to said crops and the projection of the flame into said space in relation to the temperature of the products of combustion and moisture which have been separated from said dehydrated crops.

8. In an apparatus for dehydrating crops of natural plants, a dehydrating drum, means for supplying a crop to be dehydrated to said drum at one end thereof, a burner extending into said drum adjacent the crop supply means to emit flame to which the crop in the drum is exposed for evaporating the moisture in said crop, an air delivery means in said drum over and spaced from said burner, means for supplying said air delivery means with air for discharge over the flame, means for separating the products of combustion and evaporated moisture from the dehydrated crop, an outlet from said separating means for the products of combustion of the burner and moisture evaporated from the dehydration of said crop, a fuel supply for said burner, valves controlling said fuel and air supplies, means mounted adjacent said outlet and responsive to the temperature of the products of combustion and evaporated moisture passing therethrough after they are separated from the crops for actuating said valves for controlling the supply of air to the dehydrator and fuel to the burner in relation to temperatures in said outlet.

9. In an apparatus for dehydrating crops of natural plants, a dehydrating drum having walls therein, a transversely arranged baffle in the drum of less width than the inner diameter of the drum for separating said drum into primary and secondary dehydrating chambers, and providing an annular space for communication therebetween, a burner to emit flame into the primary chamber in spaced relation to the walls of said drum, means for supplying a crop to be dehydrated to the primary chamber, means for discharging an air blast under pressure into the primary chamber above and spaced from the flame from the burner, said air blast being wider than the flame whereby the difference in temperature of the air and flame and the rising tendency of the heat of the flame effects envelopment thereof by the air to prevent the crop from being burned by the flame, means for rotating the drum, means in the primary chamber for agitating and dropping said crop only through the air current and at the sides of the flame, means in the secondary chamber for agitating and dropping the crop across the entire area of the drum, and a separator for separating the dehydrated crop, products of combustion and vaporized moisture received from the drum.

10. In an apparatus for dehydrating crops of natural plants, a dehydrating drum having walls, a transversely arranged baffle in the drum of less width than the inner diameter of the drum for separating said drum into primary and secondary dehydrating chambers and providing an annular space for communication therebetween, a burner to emit flame into the primary chamber at an end thereof in spaced relation to the walls of said drum, means for supplying a crop to be dehydrated to the primary chamber at one side of the burner, means for discharging an air blast under pressure into the primary chamber above and spaced from the flame from the burner, said air blast being wider than the flames whereby the difference in temperature of the air and flame and the rising tendency of the heat of the flame effects downward movement of the air at the sides of the flame and substantial envelopment thereof by the air to prevent the crop from being burned by the flame, means for rotating the drum, means in the primary chamber for agitating and dropping said crop only through the air current and at the sides of the flame, means in the secondary chamber for agitating and dropping the crop across the entire area of the drum, a separator for separating the dehydrated crop, products of combustion and vaporized moisture received from the drum, a stack on the separator for release of the products of combustion and vaporized moisture from the separator, and means including a thermostat adjacent the outlet of the separator and responsive to the temperatures of the products of combustion and vaporized moisture passing through the stack after they are separated from the crop for controlling projection of the flame and air into the primary chamber.

11. The method of dehydrating crops of natural plants consisting of delivering a stream of a crop to one end of a horizontal drying chamber, applying an open flame to the same end of and spaced from the sides of said chamber to effect vaporization of moisture in said crop, said vaporization cooling the crop below the ignition temperature, directing a blast of air under pressure into said chamber prior to mixing with the products of combustion, said air blast being spaced above and of greater width than the flame whereby difference in temperature of the air and flame and the rising tendency of the heat of the flame effects downward movement of the air at the sides of the flame for protecting said crop from said flame by substantial envelopment of the flame by the air and to effect movement of the crop through the chamber, separating said vaporized moisture and products of combustion from said dehydrated crop, releasing said products of combustion and vaporized moisture from said chamber, withdrawing said dehydrated crop from the chamber, and exposing said dehydrated crop to atmosphere during withdrawal to cool said crop.

DEWEY L. HOWARD.